United States Patent [19]

Weiss

[11] Patent Number: 4,708,692

[45] Date of Patent: Nov. 24, 1987

[54] FLEXIBLE ALL-STEEL SHAFT COUPLING

[75] Inventor: Rudolf Weiss, Vreden, Fed. Rep. of Germany

[73] Assignee: Atec-Weiss KG, Vreden, Fed. Rep. of Germany

[21] Appl. No.: 801,883

[22] Filed: Nov. 26, 1985

[30] Foreign Application Priority Data

Nov. 29, 1984 [DE] Fed. Rep. of Germany ....... 3443485

[51] Int. Cl.$^4$ .............................................. F16D 3/78
[52] U.S. Cl. ..................................... 464/69; 464/137; 464/147
[58] Field of Search ..................... 464/69, 94, 98, 99, 464/, 147, 137

[56] References Cited

U.S. PATENT DOCUMENTS

| | | | |
|---|---|---|---|
| 1,454,087 | 5/1923 | Thomas | 464/99 |
| 2,431,409 | 11/1947 | Mart | 464/69 |
| 3,494,147 | 2/1970 | Goody | 464/69 |
| 3,500,658 | 3/1970 | Goody | 464/99 |
| 4,019,346 | 4/1977 | Fukuda | 464/69 X |
| 4,482,335 | 11/1984 | Goody | 464/99 X |

FOREIGN PATENT DOCUMENTS 877499 12/1942 France .................................. 464/69
1327775 8/1973 United Kingdom .................. 464/99

Primary Examiner—Daniel P. Stodola
Attorney, Agent, or Firm—Sprung Horn Kramer & Woods

[57] ABSTRACT

A flexible all-steel shaft coupling has two coupling halves each comprising a connecting flange and which are axially and angularly movable but antitorsionally connected to each other through a yieldable stapled lamella crown connected to the connecting flanges. Each connection of the stapled lamella crown with one of flanges consists of a bolt on which rests, in clamped position between spacer rings, the stapled lamella crown on a spring collet provided with a conical press seat. Due to its conical support on the bolt, the conical spring collet is radially expanded and transmits radial pretension into bores of the stapled lamella crown. Due to the tolerance-free support of the stapled lamella crown on the bolt, and due to radial pretension in the bores of the stapled lamella crown, the shaft coupling may be easily mounted without precision machning and without tolerance on the support seats, while expansions and ovalizations of the bores, which lead to ruptures due to notch corrosion are prevented.

7 Claims, 7 Drawing Figures

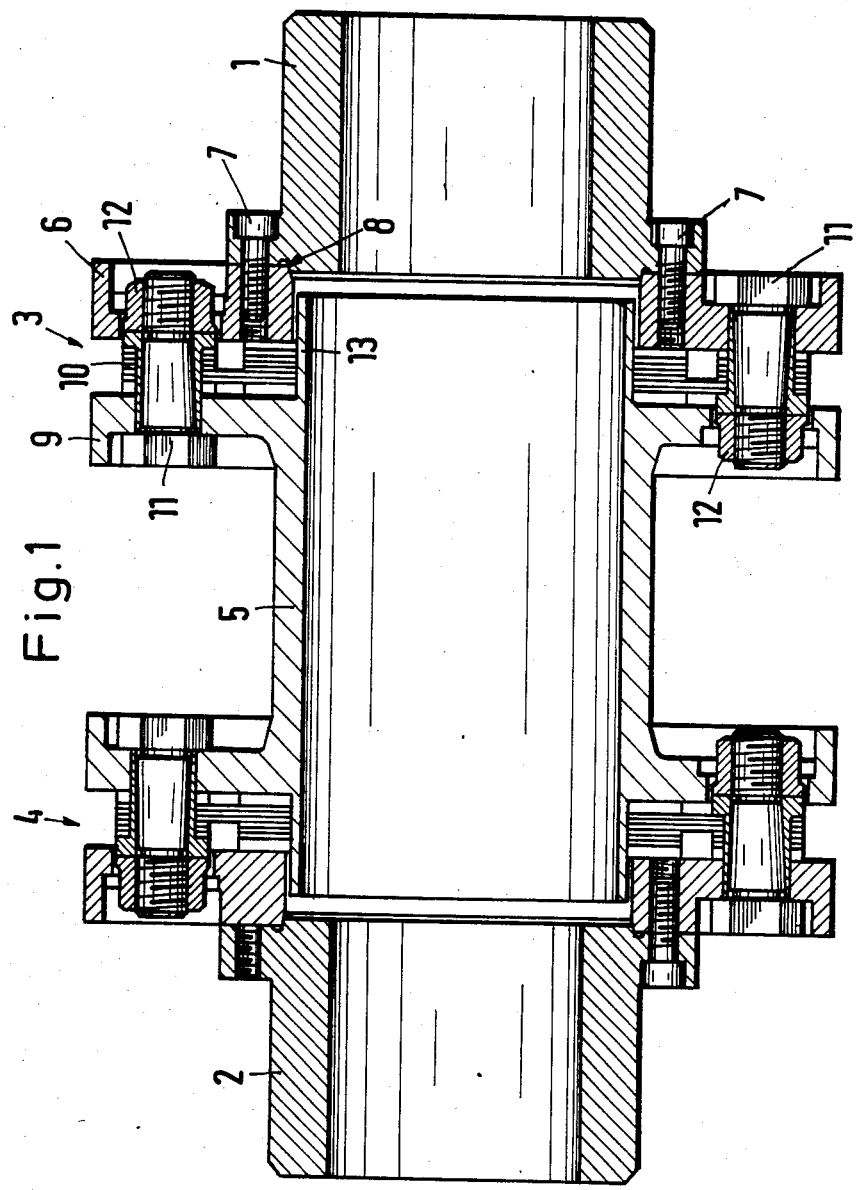

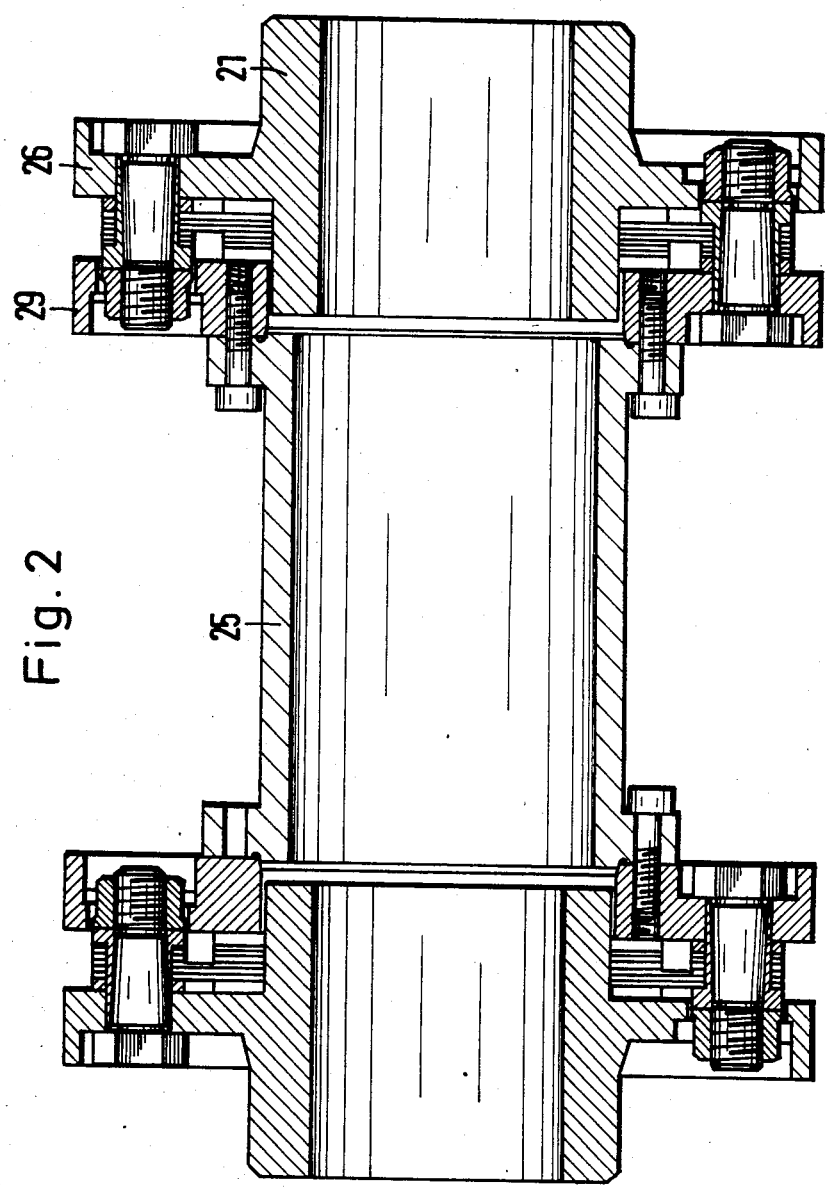

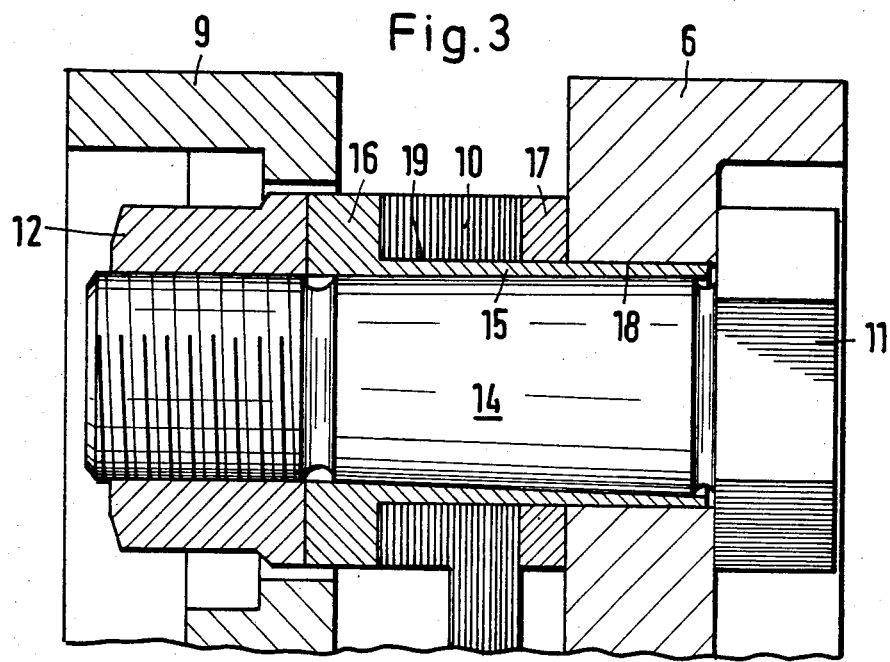
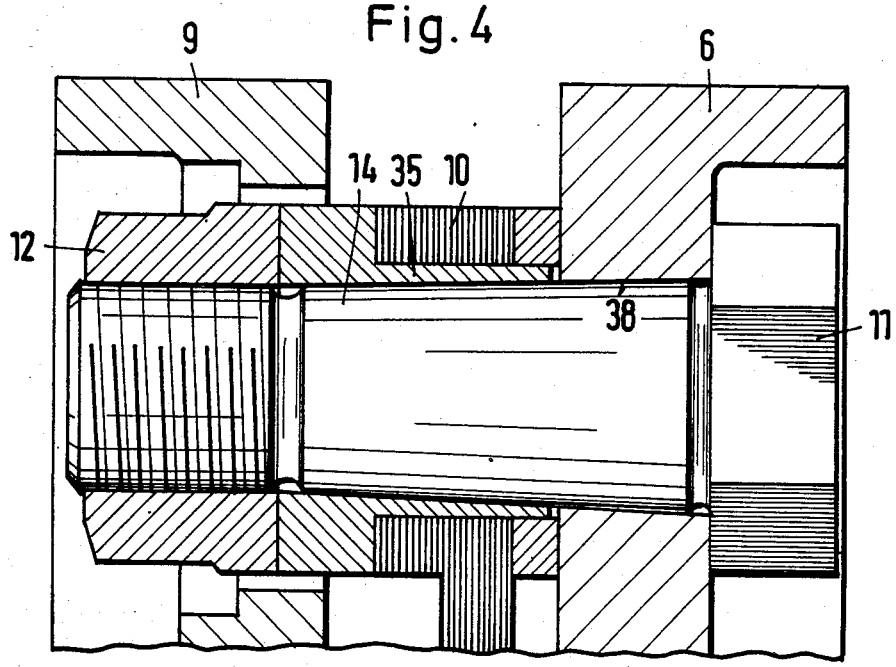

FLEXIBLE ALL-STEEL SHAFT COUPLING

BACKGROUND OF THE INVENTION

1. Field of the Invention:

The invention relates to a flexible all-steel shaft coupling comprising a connecting flange for each of the coupling halves, and a yieldable stapled lamella crown located in axially spaced relationship between said connecting flanges, and alternately connected in the circumferential direction by means of clamp bolts to one or the other connecting flange, said stapled lamella crown sitting on spring collets of the clamp bolts and being clamped between spacer rings with the connecting flange.

Such couplings, connected in series either individually or by pairs, are used for torque transmission. As individual couplings they allow an angle and an axial displacement and as a pair of coupling they additionally permit even a parallel displacement of the drive with respect to the transmission.

In order to be able to operate such couplings at high rotational speed, big efforts have been made to avoid imbalances already during the assembly operation. Such imbalances are mainly caused by the stapled lamella crown. This does not only apply to stapled lamella crowns composed of individual lamella tongues but also to those crowns consisting of lamella rings.

2. Discussion of Prior Art:

In a prior shaft coupling of the above mentioned type cylindrical press seats are provided with and without high precision spring collets between the clamp bolt, the collet and the bores in the stapled lamella crown on one hand and the bores in the connecting flange on the other hand. Such press seats require as well complex fabrication methods as a very careful and timeconsuming assembly (DE-AS 26 45 600).

In order to avoid these drawbacks the stapled lamella crown of another shaft coupling forms a preassembled packaged together with a centering ring connected thereto by means of screw bolts. The centering ring is provided with a finely machined circumference forming a press seat together with a correspondingly finished flange circumference. Said preassembled unit is alternately secured by means of clamp bolts—eventually through interconnected guide sleeves—to the pair of flanges. Though in said shaft coupling the lamella crown is centered by the centering ring, there have not been made any provisions to compensate the fabrication caused tolerance between clamp bolt and stapled lamella crown. Pulsatory loads may cause a displacement of the clamp bolts due to said tolerance thus causing renewed imbalance.

The operation of the shaft couplings of the above mentioned type has shown that even in case of very precisely machined press seats there occur ruptures due to notch corrosion at the clamping points of the stapled lamella crown.

SUMMARY OF THE INVENTION

1. Object of the invention

The present invention is based on the object to design a shaft coupling of the above mentioned type permitting the use of stapled lamella crowns consisting either of lamella tongues or of lamella rings, which does not require preassembly of the stapled lamella crown and which finally is less sensitive to ruptures due to notch corrosion.

2. Solution of the invention

According to the invention this object is solved by a conical design of the seat of each spring collet for the stapled lamella crown on the clamp bolt, wherein the axial dimensions of the stapled lamella crown, the clamp ring and the connecting flanges on the one hand and those of the spring collet on the other hand as well as the conical seats are adapted to one another in such a way that due to the axial clamping force of the clamp bolt the lamella crown submitted to axial pretension at the clamping points, is submitted to an additional radial pretension at the seat of the spring collets expanded due to the conical seat during pretension.

The invention allows one to obtain in a relatively simple way an absolutely tolerance-free seat of the stapled lamella crown on the clamp bolt without necessitating high precision machined and thus expensive seat surfaces. At each clamping point is produced by means of a single clamp bolt, axial as well as radial pretension in the stapled lamella crown. Due to the radial pretension produced by the expanded spring collet at each clamping point it is no more possible, as a difference to stapled lamella crowns which are not radially pretensioned, that at the clamping points the bores in the lamellas are ovalized by tension stresses acting in the lamellas. Consequently, the lamella movement at the clamping points due to ovalization and the friction corrosion caused thereby, responsible for ruptures, does no longer occur. Due to the thus produced radial pretension at the lamella seats the coupling also withstands pulsatory loads which formerly led to lamella displacements thus causing imbalances. Finally, the invention permits one to simplify assembly compared to other couplings. The device may be mounted in situ without preassembly by means of additional centering rings and without high precision machined cylindrical seats.

The following advantageous details of the invention may be separately or as a selection or all together realized.

The manufacture of a tolerance-free seat between the clamp bolt and the related connecting flange is less critical than the manufacture of the seat in the area of the stapled lamella crown. Nevertheless, also in this case it is advantageous if the seat between the clamp bolt and the related connecting flange is designed—eventually together with a spring collect—as clamping cone.

According to another inventive embodiment the conical seats in the area of the stapled lamella crown should be provided between the spring collet and the clamp bolt because it is easier to manufacture the conical seats at this location than between the spring collet and the bores of the stapled lamellas. In an analogous manner the conical seats in the area of the related connecting flange are provided between the spring collet and the clamp bolts. But it is also possible to arrange the conical seats between the spring collet and the bores of the connecting flange.

In order to facilitate assembly as well as disassembly, the conical seats should present in the area of the stapled lamellas and of the connecting flanges an inclination ranging below automatic locking. Preferably, both seats should have the same inclination.

As far as there is provided a spring collet as well in the area of the stapled lamellas as in the area of the related connecting flanges, said two spring collets may be combined into a continuous spring collet. The centering effect acting on the stapled lamella crown may be further improved if the bolt circles of the connecting flanges are slightly larger than the corresponding bolt circles of the stapled lamella crown. Thus is produced pretension also in circumferential direction of the lamellas. This permits in particular for tongue lamellas to compensate differences in length.

DESCRIPTION OF EMBODIMENTS OF THE INVENTION

Brief Description of the Drawing

FIG. 1 shows an axial sectional view of two identical hollow shafts connecting coupling shafts arranged in series;

FIG. 2 shows an axial sectional view of two identical hollow shafts connecting coupling shafts in another emembodiment than that shown in FIG. 1;

FIG. 3 shows an axial sectional view of a first embodiment of the connection point of a stapled lamella crown at a connecting flange;

FIG. 4 shows a second embodiment of the device shown in FIG. 3;

DETAILED DESCRIPTION OF THE INVENTION

Figure 5:
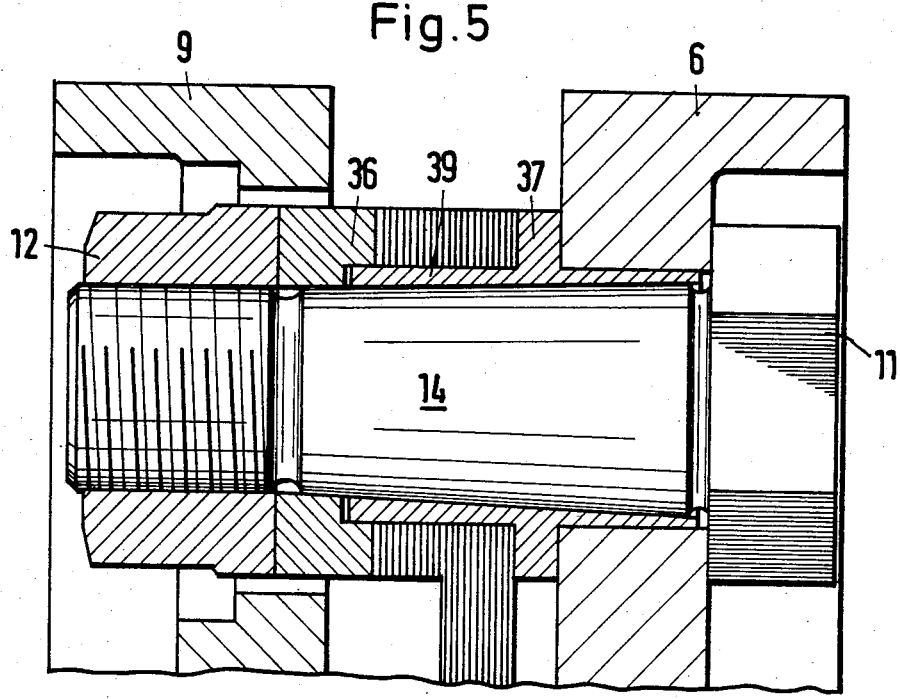
FIG. 5 shows a third embodiment of the device shown in FIG. 3.

According to FIG. 1 two hollow shafts 1, 2 are coupled by means of two identical couplings 3, 4 connected to each other through a collet 5. Since couplings 3, 4 have the same design, the text hereafter only describes in detail coupling 3.

A connecting flange 6 is secured by means of screw bolts 7 to hollow shaft 1. Connecting flange 6 is centered on hollow shaft 1 by means of a conical press seat 8. Opposite connecting flange 6 is located a connecting flange 9 of connecting collet 5. Between the pair of connecting flanges 6, 9 is provided a stapled lamella crown 10 composed of individual tongue packages. The stapled lamella crown 10 provided in spaced relationship between flanges 6, 9 is alternately secured by means of screw or clamp bolts 11 to one of flanges 6, 9. As the drawing shows, in the case of securing lamella crown 10 by means of screw bolts 11 to connecting flange 9, flange 6 at the opposite location is designed with tolerance with respect to bolt nut 12.

In order to avoid that in case of rupture of coupling 3 collet 5 becomes unguided in the area of coupling 3, said collet 5 is provided with a shoulder 13 extending into the area of connecting flange 6.

The embodiment of FIG. 2 differs from the embodiment of FIG. 1 only by the fact that connecting flange 26 of shaft 21 is not screwed on but shaped in one piece therewith, while connecting flange 29 correlated to collet 25 is screwed on.

According to FIG. 3 shank 14 of bolt 11 is of conical design. The taphole of spring collet 15 resting on shank 14 is also of conical design. At the face turned toward bolt nut 12 the spring collet is provided with a collar 16 serving as a spacer ring for stapled lamella crown 10. At the opposite face of the stapled lamella crown 10 a spacer ring 17 is provided between the latter and the adjacent connecting flange 6 resting on spring collet 15.

Spring collet 15 extends through stapled lamella crown 10 into the bore of connecting flange 6. The outside of spring collet 15 is of cylindrical design. Bores 18, 19 in connecting flange 6 and in stapled lamella crown 10 are also designed cylindrically.

During tensioning of the clamp bolts spring collet 15 is radially expanded. Eventual tolerances between spring collet 15 and bores 18, 19 of connecting flange 6 and stapled lamella crown 10 are compensated and pretension is even produced. Consequently, torque-transmitted pulsatory loads no more cause a displacement of the individual parts and thus renewed imbalance of the shaft coupling.

The embodiment of FIG. 4 differs from that shown in FIG. 3 only by the fact that spring collect 35 does not extend into the area of connecting flange 6. In this embodiment bore 38 in connecting flange 6 is of conical design.

The embodiment shown in FIG. 5 differs from that of FIG. 3 only by the fact that spacer ring 37 is connected as a collar in one piece with spring collet 39 while the other spacer ring 36 is not designed as an integral collar but as independent ring target.

Figure 6:
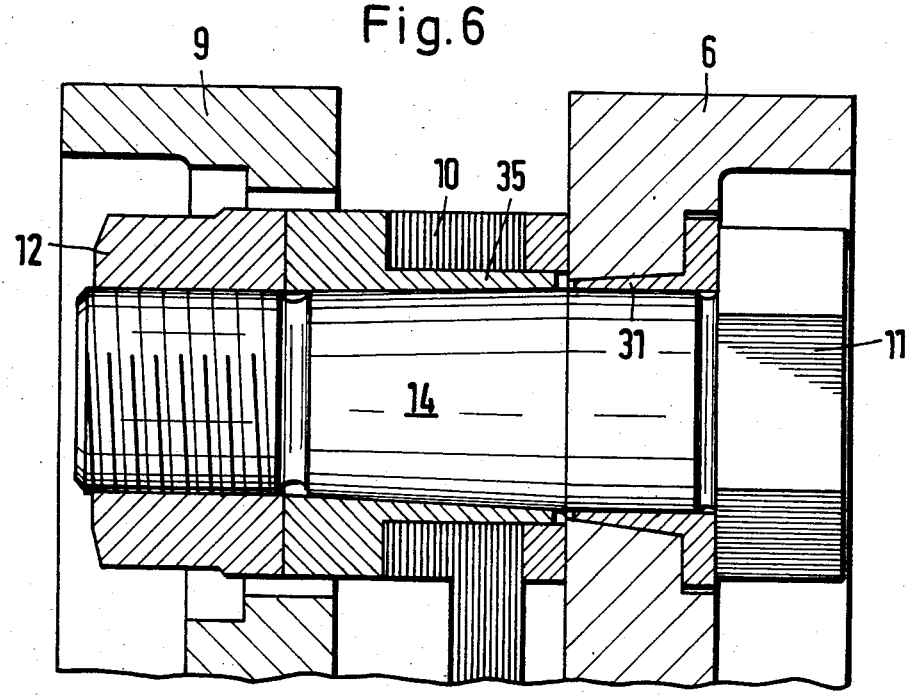
FIG. 6 shows a fourth embodiment of the device shown in FIG. 3.

In the embodiment shown in FIG. 6, which corresponds in the area of spring collect 35 to that of FIG. 4, the area of connecting flange 6 is provided with a separate spring collet 31, the inside of which is cylindrical while the outside is conical so that it cooperates as a clamping cone with the related conical bore in connecting flange 9.

Figure 7:
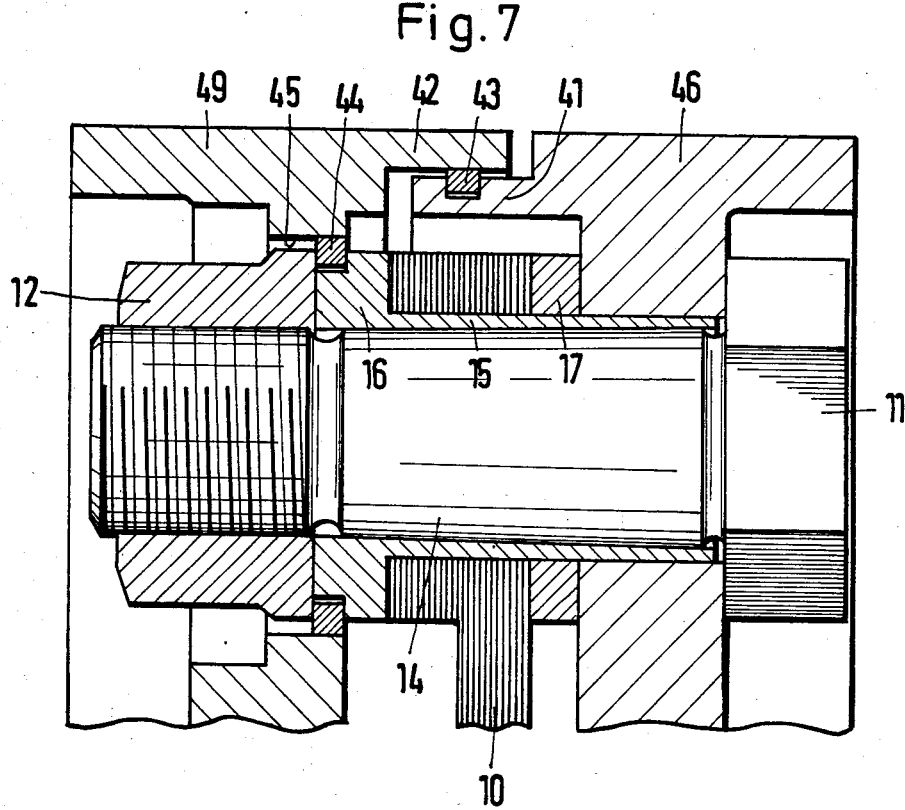
FIG. 7 shows a fifth embodiment of the device shown in FIG. 3.

Concerning the connection between the stapled lamella crown 10 and the connecting flange the embodiment of FIG. 7 conforms with that of FIG. 3. Nevertheless, the adjacent connection flanges 46, 49 support coaxial overlapping sleeve-like rims 41, 42 between which are provided seals 43 acting in the way of piston segments. By this measure air escape is to be avoided from the space between the flanges to the outside causing disturbing noises. An additional seal 44 is provided between the screw connection and the related toleranced bore 45 in connecting flange 49. Thus the complete lamella staple is practically closed against the outside thus preventing air turbulence losses.

What is claimed is:

1. In a flexible all-steel shaft coupling comprising a connecting flange for each coupling half, a yieldable stapled lamella crown having bore holes and located in an axially spaced relationship between the connecting flanges, and alternately connected in a circumferential direction by clamp bolts to one or the other of the connecting flanges, wherein the bore holes of the stapled lamella crown are seated on spring collets having tap holes therethrough and the lamella crown clamped between spacer rings by the clamp bolts which extend through the top holes, the improvement comprising means for effecting radial expansion of the spring collets in response to axial tension by the clamp bolts comprising to subject the lamella crown to both axial pretension and to radial pretension at the spring collets.

2. The coupling according to claim 1, wherein the radial expanding means comprises the tap holes of each spring collet and each bolt having a conical shape and wherein the lamella crown and spring collets are configured to effect contact of the lamella crown by the spring collets in response to increased axial tension force by each bolt in each tap hole.

3. The coupling according to claim 2, wherein each flange has holes for receiving the bolts and wherein the flange holes are conical.

4. The coupling according to claim 3, wherein the flange holes have separate spring collets therein.

5. The coupling according to claim 2, wherein each flange has cylindrical holes for receiving the bolts and wherein the spring collets have portions extending into the flange holes and having a tap hole having the same conical inclination as the remainder of the spring collet.

6. The coupling according to claim 2, wherein each flange has holes for receiving the bolts and the flange holes and the lamella crown bores lie in a circle and wherein the circle of the flange holes has a larger diameter than the circle of the lamella crown bores.

7. The coupling according to claim 1, wherein one spacer ring is integral with each spring collet.

* * * * *